(12) United States Patent
Fischer et al.

(10) Patent No.: US 7,808,346 B2
(45) Date of Patent: Oct. 5, 2010

(54) ROTARY JOINT HAVING AIR BEARINGS FOR CONTACT FREE MOUNTING

(75) Inventors: Franz Fischer, Prien (DE); Christian Stadler, Bad Aibling (DE)

(73) Assignee: Spinner GmbH (DE)

( * ) Notice: Subject to any disclaimer, the term of this patent is extended or adjusted under 35 U.S.C. 154(b) by 232 days.

(21) Appl. No.: 12/134,407

(22) Filed: Jun. 6, 2008

(65) Prior Publication Data

US 2008/0303614 A1    Dec. 11, 2008

(30) Foreign Application Priority Data

Jun. 6, 2007    (DE) .............. 10 2007 026 431

(51) Int. Cl.
*H01P 1/06*    (2006.01)
(52) U.S. Cl. ...................................... 333/261
(58) Field of Classification Search ........... 333/256, 333/257, 261
See application file for complete search history.

(56) References Cited

U.S. PATENT DOCUMENTS

| | | | | |
|---|---|---|---|---|
| 3,786,378 A | * | 1/1974 | Liguori ................. | 333/257 |
| 3,914,715 A | * | 10/1975 | Hubing et al. ........... | 333/24 R |
| 4,233,580 A | * | 11/1980 | Treczka et al. ........... | 333/261 |
| 4,258,365 A | * | 3/1981 | Hockham et al. ......... | 343/763 |
| 4,730,224 A | * | 3/1988 | Komatsu ................. | 360/64 |
| 5,564,063 A | | 10/1996 | Heinzl et al. | |
| 5,645,354 A | | 7/1997 | Heinzl et al. | |
| 7,148,773 B2 | | 12/2006 | Lohr | |

FOREIGN PATENT DOCUMENTS

EP    0951110 B1    10/1999

\* cited by examiner

*Primary Examiner*—Benny Lee
(74) *Attorney, Agent, or Firm*—Edell, Shapiro & Finnan (57) ABSTRACT

A high frequency (HF) rotary joint including a rotor and a stator is disclosed. The rotor is connected to the stator by a high frequency connection via a λ/4 line. The rotor, moreover, is mounted in the stator utilizing at least one radial aircushion bearing and at least one axial aircushion bearing. The bearings prevent contact between the rotor and the stator.

16 Claims, 7 Drawing Sheets

ROTARY JOINT HAVING AIR BEARINGS FOR CONTACT FREE MOUNTING

CROSS REFERENCE TO RELATED APPLICATIONS

This application claims priority under 35 U.S.C. §119 to Application No. DE 102007026431.5 filed on 6 Jun. 2008, entitled "HF Rotary Joint with a λ/4 Line Between the Stator and Rotor," the entire contents of which are hereby incorporated by reference.

FIELD OF THE INVENTION

The invention is directed toward a high frequency rotary coupling and, in particular, a rotary joint including a stator that at least partially encloses a rotor, wherein the rotor has a high frequency connection to the rotor.

BACKGROUND OF THE INVENTION

High frequency (HF) rotary joints (also called rotary couplings) typically have single channel or multichannel coaxial or hollow conductor couplings. In one configuration, an array transmits a wide-band electric signal between at least two components disposed for rotation relative to each other. The components are provided with coupling surfaces that are maintained at a largely constant distance from each other via the rotary movement. The space between the coupling surfaces is predominantly filled with a dielectric material.

In a coaxial, multi-channel design of a rotary joint, the rotor is mounted in the stator by means of rolling bearings such as thin ring bearings. These bearings, however, create the most mechanical and electrical or high frequency problems within the component. Because the rotor and rolling bearings consist of different materials (usually aluminum and steel), the temperature increases the friction or play due to the materials' different coefficients of thermal expansion. Increased friction regularly causes bearing damage, and increased play causes the electrical transmission properties to fluctuate. Additional disadvantages with these bearings are lubricant drainage at high temperatures, low resistance to corrosion of the roller bearings, and insufficient seal against the high frequency area, which is frequently kept at an elevated internal pressure by means of pre-dried air to improve the electric strength. HF rotary joints including rolling bearings, therefore, must undergo frequent expensive and time-consuming servicing, including a readjustment of the electrical properties after each servicing. During this process, the entire HF system to which the rotary joint belongs, such as a civil or military radar system, remains incapacitated.

It would be desirable to provide a rotary joint that addresses the above deficiencies, is long-lasting, and is substantially service-free.

SUMMARY OF THE INVENTION

The present invention is directed toward a high frequency rotary joint including a stator that at least partially encloses a rotor. The rotor is mounted in the stator in a contact-free manner. That is, contact between the rotor and the stator is prevented through the use of at least one radial air bearing and at least one axial air bearing. Air bearings are formed when air is pressed into the gap between opposed, movable parts via numerous microscopic holes. The diameter of the air bearing gap is generally constant. The air bearings effectively create an air cushion, preventing contact between the rotor with the stator. The bearing air flowing through the air bearing then simultaneously acts as cooling air for the high-frequency coupled parts that heat up considerably depending on the transmitted output.

The bearing gap may possess a value of no more than about 30 μm and preferably, less than about 15 μm. With this configuration (a generally narrow and constant bearing gap width), the standing wave ratio (VSWR) over the entire usable frequency band width of the joint is improved. In one embodiment, the air bearings may be located outside of the high frequency area. In this case, an existing design of the high frequency coupling between the stator and rotor can remain at least largely unchanged. In another embodiment, the air bearings may be located within the high frequency area.

The radial air bearing can consist of an inner surface of a hollow cylindrical section of the stator provided with radial air outlets, and a peripheral surface of a cylindrical section of the rotor. These radial air outlets in the stator are preferably distributed over both the perimeter and the axial length of the hollow cylindrical section of the stator. The radial air outlets can have a diameter of 10 μm to 100 μm and a very short axial length. To achieve a stable air cushion, these air outlets communicate with at least one annular channel in the stator connected to a compressed air source.

The axial air bearing can comprise an annular stator surface and an annular surface on one face of the rotor, wherein the annular stator surface has axial air outlets. Particularly with elongated rotary joints, the rotor can be mounted utilizing two axial air bearings that are at an axial distance from each other. The corresponding annular surfaces of the rotor can be the respective faces of the rotor. The axial air outlets of the annular surface of the stator can be distributed over the perimeter, as well as over the radius of the annular surface. Like the radial air outlets, the axial air outlets may be in (fluid) communication with at least one annular channel in the stator, with the annular channel being connected to a compressed air source. The same compressed air source may feed both the radial and axial air outlets.

Particularly preferable, especially for short high frequency rotary joints, is an embodiment in which the rotor has a least one annular section consisting of a magnetically soft material, and the stator comprises means to magnetically attract the rotor in the area of the axial air bearing. With this embodiment, just a single axial air bearing is sufficient because equilibrium of forces arises within the radial air bearing gap between the air cushion and the magnetic attraction between the stator and rotor.

The rotor section may be formed from a magnetically soft material (e.g., a magnetically soft ring), and the rest of the rotor can consist of a "light" metal (e.g, metals having a lower atomic weight and/or lower specific gravity). With this embodiment, it is advantageous when the stator also consists of a light metal since this saves a substantial amount of overall weight. To take into account the different expansion coefficients of the rotor material and the material of the magnetically soft ring, the ring may be radially divided at at least one point on its perimeter, and may be slidably connected to the rotor in a peripheral direction.

The rotary joint may further include magnetic attraction means such as axially-polarized permanent magnets evenly distributed over the perimeter of the stator. The pole surfaces of the permanent magnets facing the rotor can be magnetically connected via a field distribution ring to balance, in a peripheral direction, the attraction between the rotor and stator counteracting the air cushion in the bearing gap.

Signal transmission between the rotor and the stator can be accomplished via linear or folded λ/4 lines. For example at least one λ/4 line providing a high frequency connection between the rotor and the stator can be radially arranged and folded to reduce the diameter of the joint. The diameter of the high frequency rotary joint can also be reduced at the cost of increasing its length by contrastingly arranging the λ/4 line axially. A compromise between the length and diameter of the rotary joint can be reached by providing an axial, folded λ/4 line.

BRIEF DESCRIPTION OF THE DRAWINGS

FIG. 3a illustrates a close-up view of the bearing gap of FIG. 3, showing the radial air bearing gap and the axial air bearing gap.

FIG. 5 FIG. 1 illustrates a cross sectional view of a high frequency rotary joint in accordance with another embodiment of the invention.

Like reference numerals have been used to identify like elements throughout this disclosure and may not be described in detail for each drawing figures in which they appear.

DETAILED DESCRIPTION OF THE INVENTION

Figure 1:
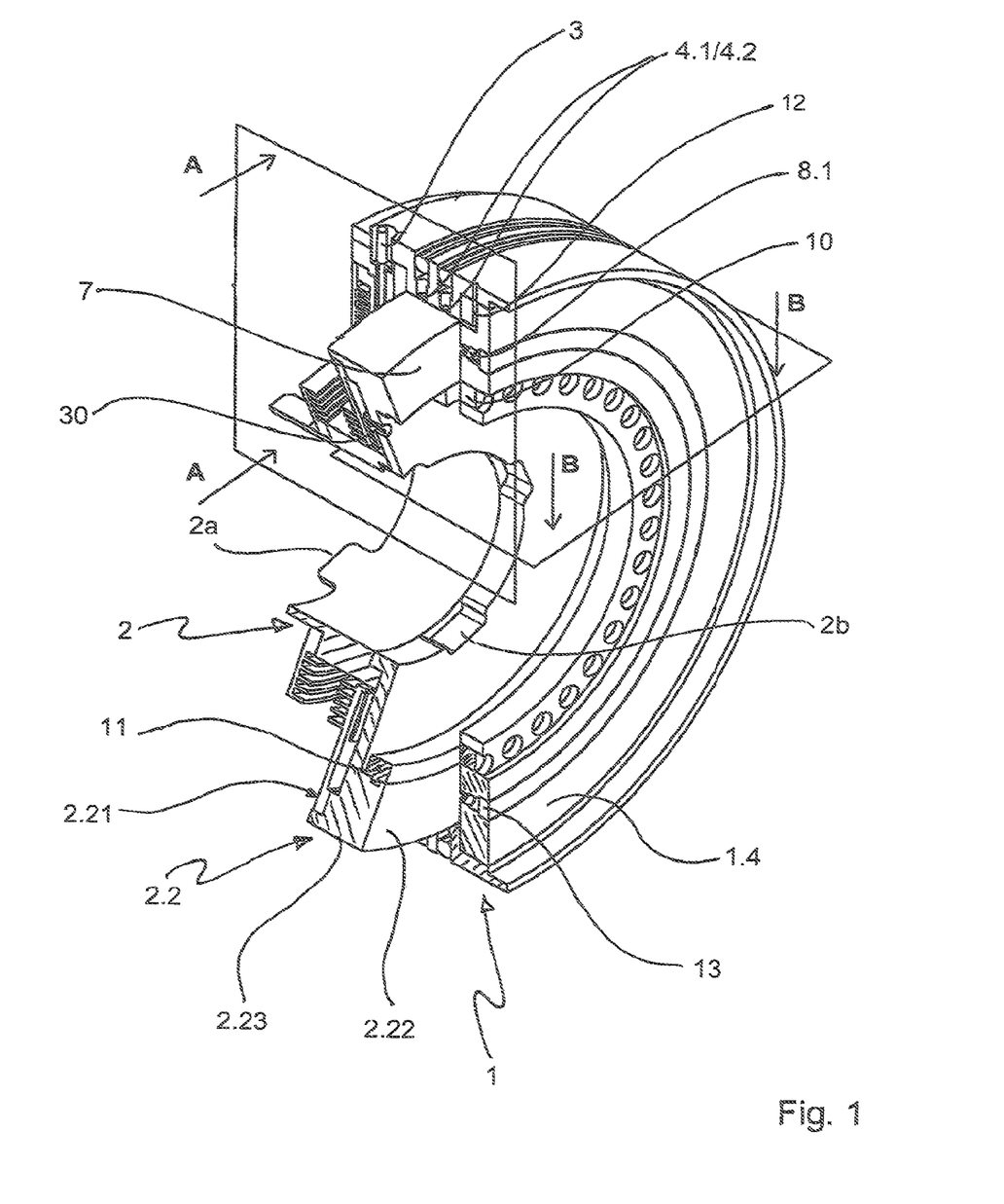
FIG. 1 illustrates a cross sectional, perspective view of a high frequency rotary joint in accordance with an embodiment of the invention, showing the stator and the rotor.
Figure 2:
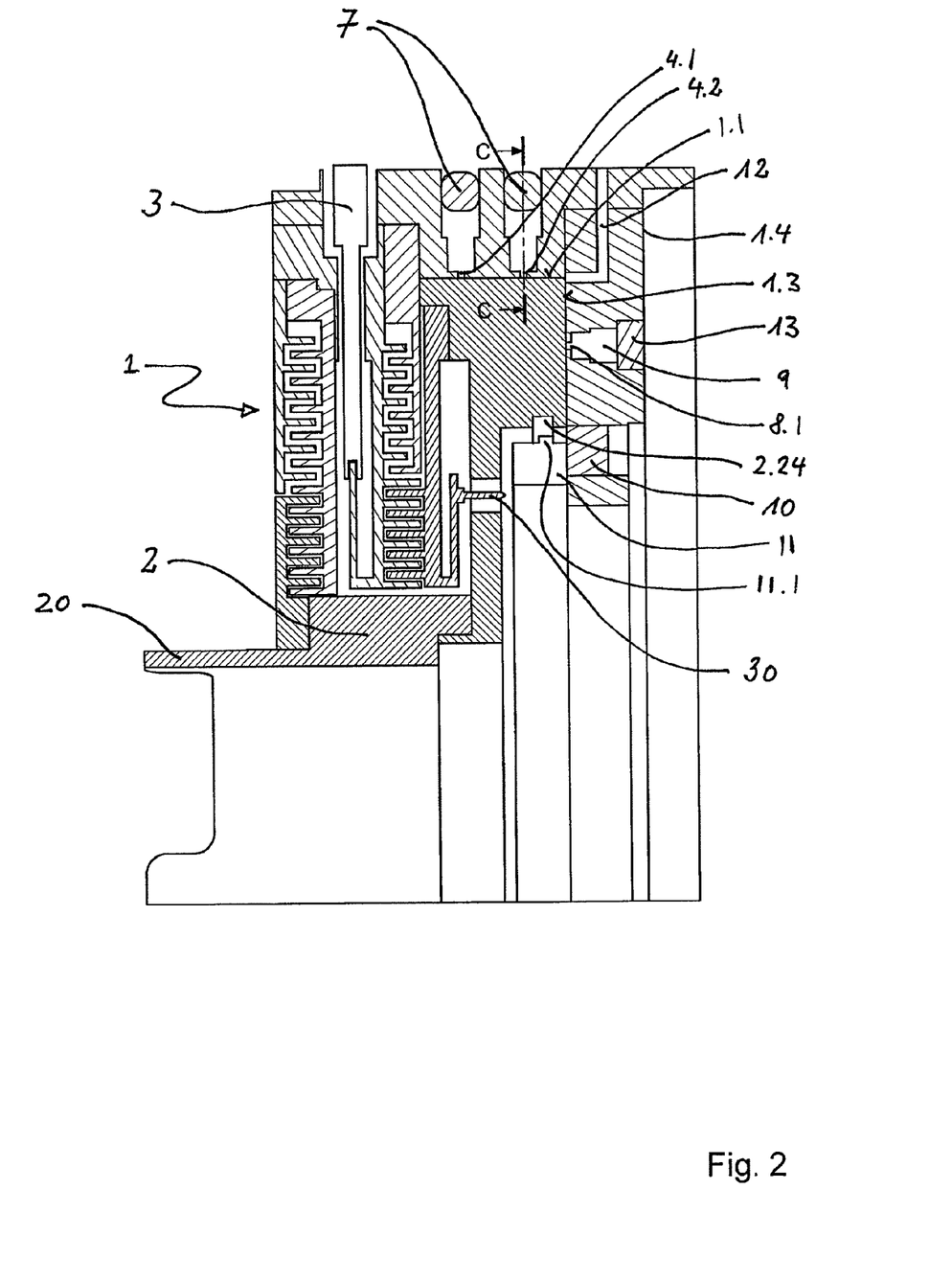
FIG. 2 illustrates a cross sectional view taken along line A-A of FIG. 1.

FIGS. 1-4 illustrate a rotary joint (coupling) in accordance with an embodiment of the invention, showing a configuration having a radial air bearing and an axial air bearing. Referring to FIG. 1, a stator 1 includes a rotor 2 mounted within the stator via a radial air bearing and an axial air bearing. In terms of high frequency engineering, the stator 1 forms the outer conductor for a coaxial connection to a first inner conductor 3. The stator 1 indirectly contacts the rotor 2 via a plurality of folded λ/4 lines in a galvanically-contactless manner. The rotor 2 coaxially connects with a second inner conductor 30 at a point along its perimeter to receive or supply high frequency (HF) signals.

Figure 3:
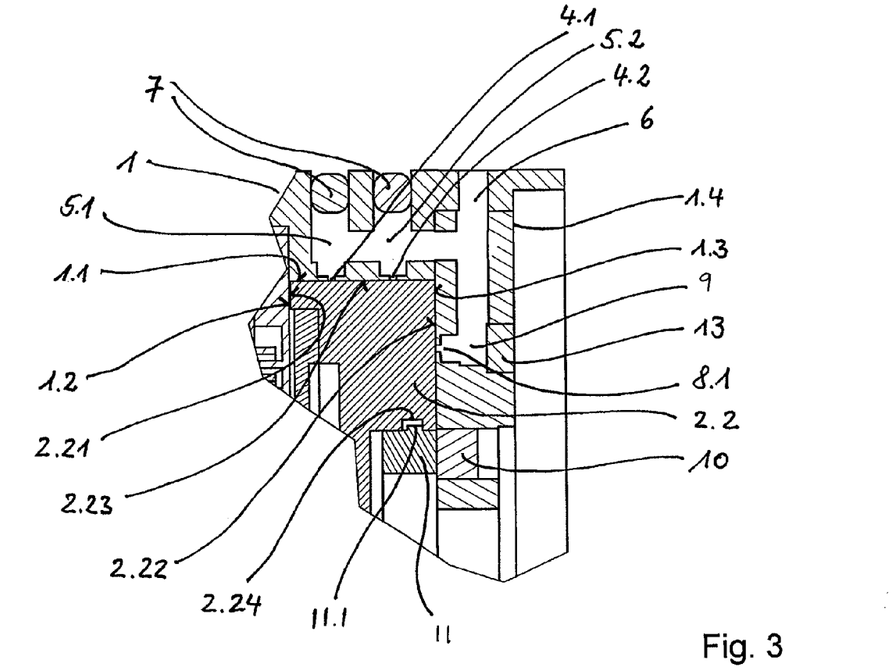
FIG. 3 illustrates a cross sectional view taken along line B-B of FIG. 1.

The rotor 2 includes driver tabs 2a and driver recesses 2b for connecting to, e.g., a rotary drive and/or a radar antenna. The rotor 2 may include a flange ring 2.2 that engages a hollow cylindrical section of the stator 1. The flange ring 2.2 possesses a first generally annular face 2.21, a second generally annular face 2.22 opposite the first annular face, and a generally cylindrical peripheral surface 2.23. The cylindrical peripheral surface 2.23, together with a hollow, cylindrical, lateral surface 1.1 of the stator 1 (best seen in FIG. 2), adjoins a radial air bearing. Referring to FIG. 3, radial air outlets 4.1 and 4.2 are in communication with the hollow cylindrical lateral surface 1.1. The radial air outlets 4.1 and 4.2 are connected to one or more peripheral annular channels 5.1 and 5.2 that, in turn, communicate with a common connection 6 that supplies compressed air from an external source (not illustrated). The annular channels 5.1 and 5.2 are sealed utilizing a seal 7 such as an O-ring.

Figure 4:
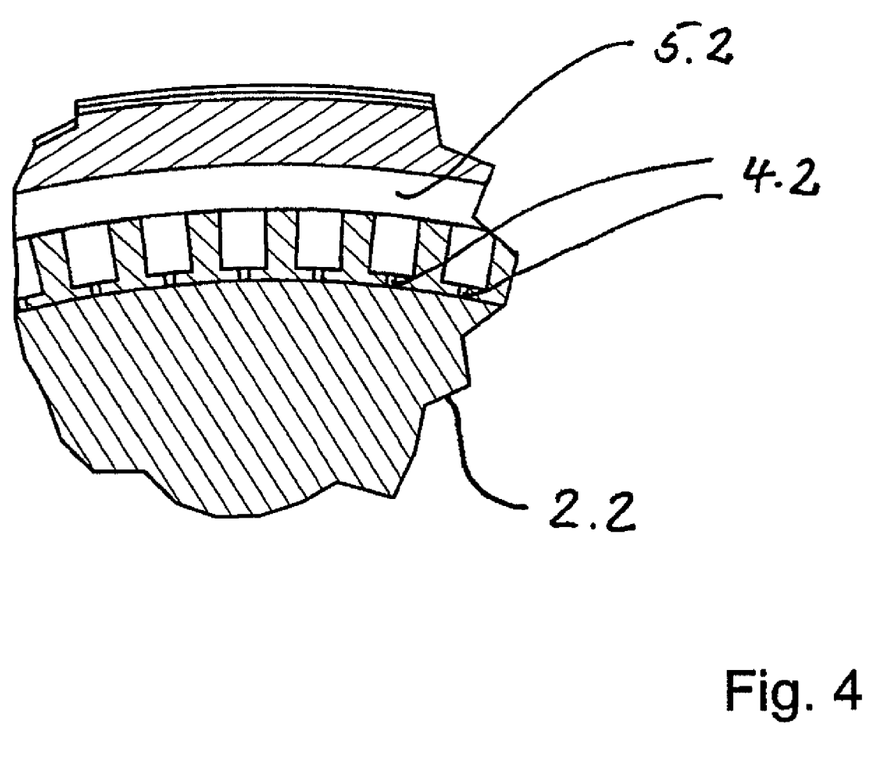
FIG. 4 illustrates a cross sectional view taken along line C-C of FIG. 2.

The radial air outlets 4.1 and 4.2 may possess a diameter of, e.g., about 60 to about 80 μm. The configuration of the radial air outlets (the number and placement), moreover, is not limited to that illustrated. For example, the radial air outlets 4.1 and 4.2 may be evenly distributed over the perimeter of the stator's hollow cylindrical lateral surface 1.1 (as shown in FIG. 4), or may be unevenly distributed (e.g., to better accommodate various load amounts). Depending on the thickness of the flange ring 2.2 in its axial direction, a single row of radial air outlets 4.1 and 4.2 may be provided. Alternatively, two or more parallel rows of radial air outlets can be provided.

In operation, when compressed air is blown in through the common connection 6, a radial air bearing gap of about 10 to about 20 μm (which is generally constant over the perimeter) arises between the peripheral surface 2.23 of the flange ring 2.2 and the hollow cylindrical lateral surface 1.1 of the stator 1.

The hollow cylindrical section of the stator 1 includes a first generally annular surface 1.2 and a second generally annual surface 1.3 that opposes the first annular face 2.21 and the second annual face 2.22 of the rotor 2. The stator faces 1.2, 1.3 and rotor surfaces 2.21, 2.22 are far enough from each other for a peripheral annular gap to exist between them. The second annular face 2.22 of the flange ring 2.2 adjoins an axial air bearing (together with the opposing second annular surface 1.3) in a bearing cover 1.4 of the stator 1. To this end, axial air outlets 8.1 (FIG. 3) may extend into the annular surface 1.3, with the air outlets being evenly distributed over the perimeter. The axial air outlets 8.1 may be supplied with compressed air from a common annular channel 9 similar to the manner described above for the radial air outlets 4.1 and 4.2. The annular channel 9 may be sealed to the outside by means of a sealing ring 13, and may be communication with the same compressed air connection 6 as connected to the annular channels 5.1 and 5.2. As with the radial air bearing, the axial air bearing may include more than one row of air outlets 8.1. The air outlets 8.1, moreover, may also be unevenly distributed over the perimeter (which is beneficial under certain loads).

The air from the axial air outlets 8.1 pressed into the air bearing gap tends to displace the rotor 2 in an axial direction. To counteract this displacement, a set of permanent magnets 10 may be evenly distributed over the perimeter of the bearing cover 1.4 of the stator 1. The permanent magnets 10, which are magnetized in an axial direction, have pole surfaces facing the rotor 2 that are substantially flush with the second annular surface 1.3 of the bearing cover 1.4 of the stator 1. The permanent magnets 10 act on a steel ring 11 that is part of the rotor 2, (i.e., namely with an annular shoulder 11.1), which engages in a peripheral groove 2.24 of the flange ring 2.2, thereby connecting to the flange ring 2.2 with positive fit. To compensate for the different thermal expansions of the rotor material (e.g., a light metal alloy) and the steel ring 11, the annular shoulder 11.1 is configured sit loosely in the peripheral groove 2.24, and is divided at a point in its perimeter (best seen in FIG. 2). The steel ring 11 can be dispensed with when the rotor 2 or at least its flange ring 2.2 is formed from a ferromagnetic material.

FIG. 3a is a close up view of the bearing gap of FIG. 3, and shows the radial air bearing gap 20 and the axial air bearing gap 31. In operation, air flowing out of the radial air bearing gap 20 and the axial air bearing gap 31 exits via an a common exhaust channel 12 (best seen in FIG. 2).

The rotary joint further includes a high frequency connection to connect the rotor 2 to the stator 1. Signal transmission between the rotor 2 and the stator 1 may be accomplished via linear or folded λ/4 lines. For example, at least one λ/4 line providing a high frequency connection between the stator 1 and the rotor 2 can be radially arranged and folded to reduce the diameter of the joint. The diameter of the high frequency rotary joint can also be reduced by increasing its length, as well as by contrastingly arranging the λ/4 line axially. A compromise between the length and diameter of the rotary joint may be reached by providing an axially folded λ/4 line. In the embodiment of FIG. 1, the λ/4 is radially folded.

Figure 5:
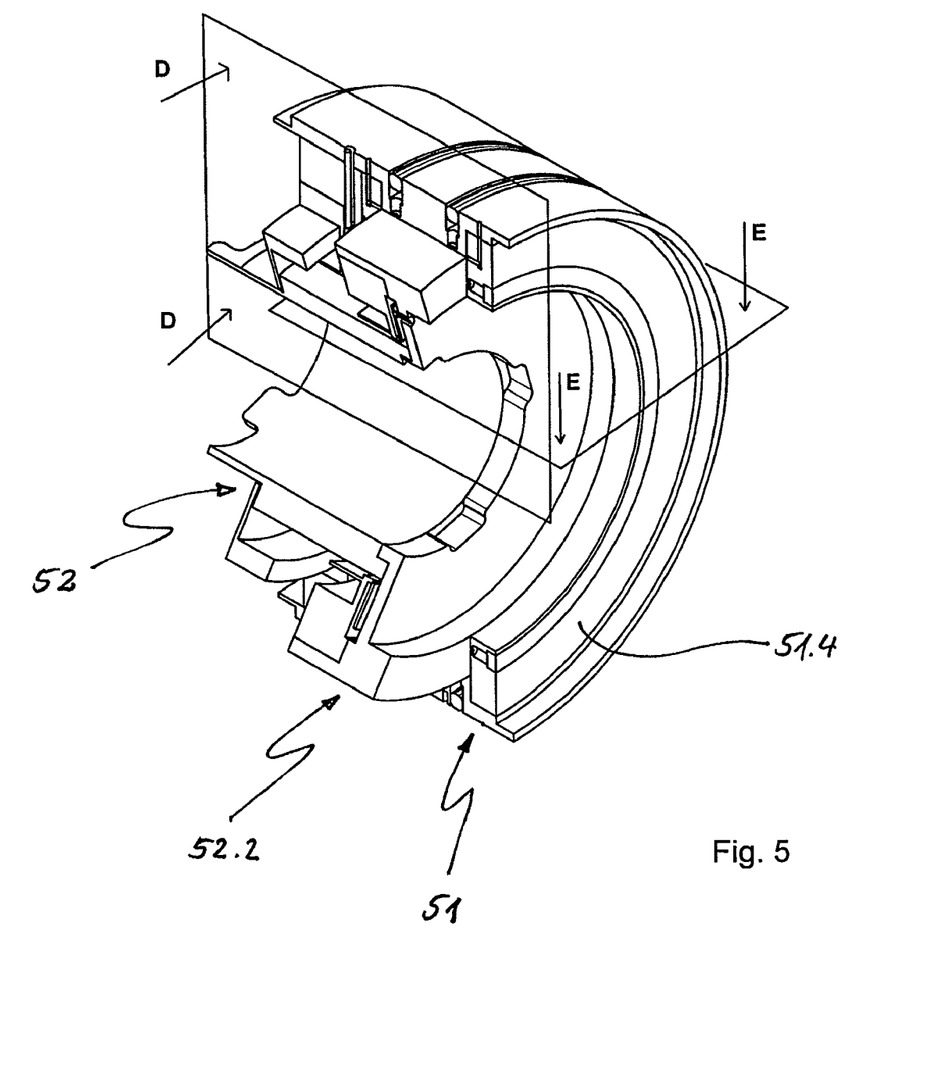
Figure 6:
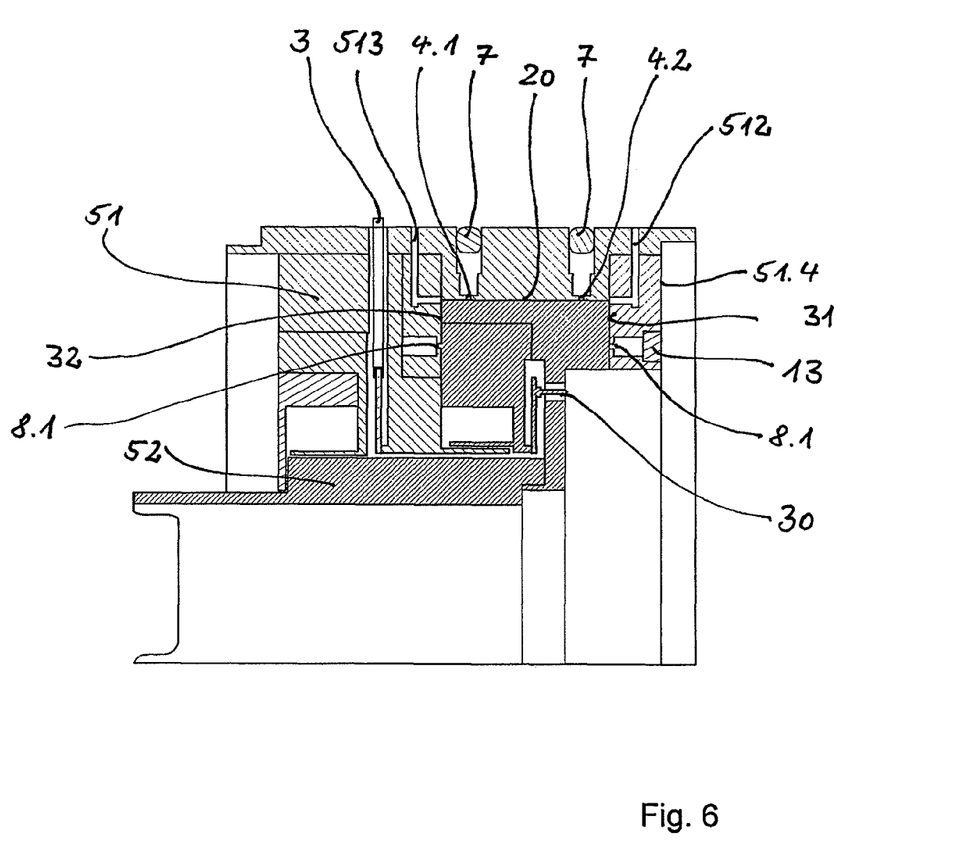
FIG. 6 illustrates a cross sectional view taken along line D-D of FIG. 5.
Figure 7:
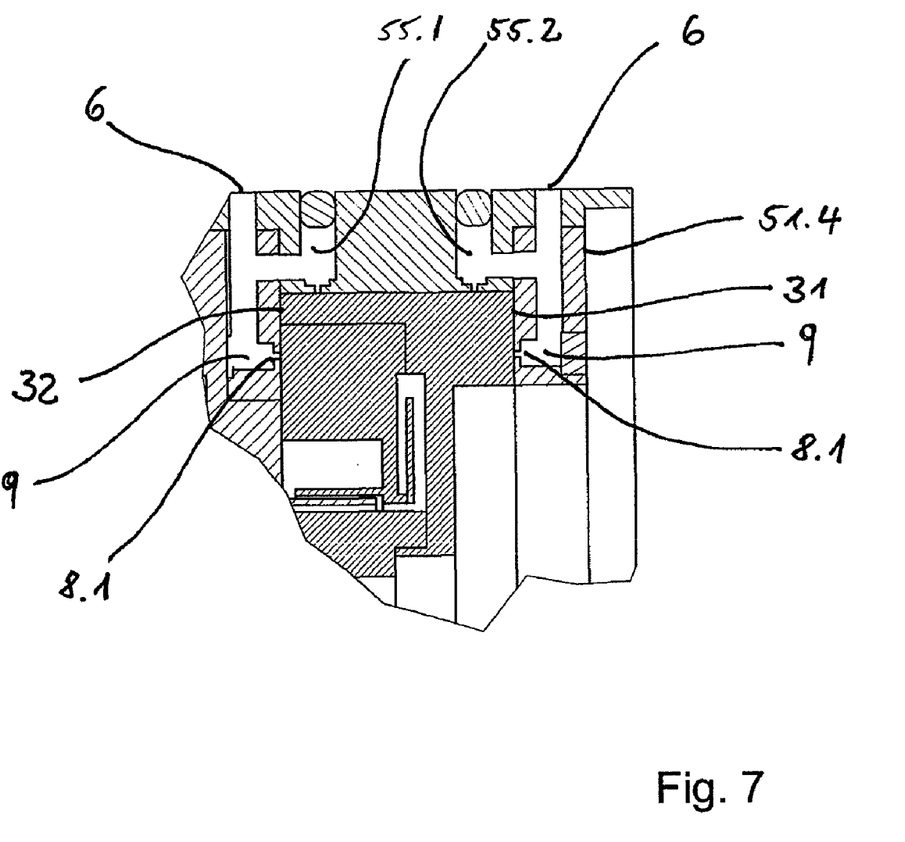
FIG. 7 illustrates a partial cross sectional view taken along line E-E of FIG. 5.

FIGS. 5 to 7 show a high frequency (HF) rotary joint in accordance with another embodiment of the invention, wherein identical parts have the same reference numbers as in FIGS. 1-4 and functionally corresponding points are preceded by the number "5" (i.e., the joint includes a bearing cover 51.4 (FIGS. 5-7) annular channels 55.1 and 55.2 (FIG. 7), an exhaust channel 512 (FIG. 6), and a sealing ring 513 (FIG. 6) etc., each as described above). This second embodiment differs from the first embodiment in that the rotor 52 (FIGS. 5 and 6) indirectly contacts the stator 51 (FIGS. 5 and 6) by means of a straight axial λ/4 line instead of a λ/4 line folded in a radial direction, and the radial flange ring 52.2 (FIG. 5) of the rotor 52 is mounted on both sides by means of axial air bearings. The radial air bearing with the air bearing gap 20 (FIG. 6) may possess the same design as that of the embodiment described above. The second (left) axial air bearing with the air bearing gap 32 (FIGS. 6 and 7) may essentially mirror the first (right) axial air bearing with the air bearing gap 31 (FIG. 7) that, in turn, corresponds to that described in the embodiment of FIG. 1. Another exhaust channel 512 (FIG. 6) is provided for the second axial air bearing.

In addition, the embodiment of FIGS. 5-7 is longer in an axial direction than the embodiment in FIGS. 1-4, but possesses a smaller diameter and dispenses with permanent magnets and a corresponding counter-piece in the rotor 52.

Thus, the present invention provides a rotary joint that eliminates the use of rolling bearings. Eliminating rolling bearings avoids the problematic temperature behavior, temperature-dependent viscosity fluctuations of the lubricant, imprecise concentricity and fluctuating input torque of the rolling bearings. When the stator 1, 51 and rotor 2, 52 are made of the same material (e.g., a generally a light metal), the problem of different thermal expansions of this material and the bearing material (normally steel) is eliminated; consequently, the air bearing gap between the stator and the rotor and hence the HF transmission properties remain largely constant. When the high-frequency area is operated with an overpressure, the generally very narrow air bearing gap can serve as a sealing gap. The input torque for the rotor is small and remains constant, especially over a wide temperature range. For all of these reasons, the HF rotary joint is practically service-free.

While the present invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

What is claimed is:

1. A high frequency rotary joint comprising:
   a rotor;
   a stator at least partially enclosing the rotor;
   a high frequency connection connecting the rotor to the stator, the connection comprising at least one λ/4 line;
   at least one radial air bearing; and
   at least one axial air bearing,
   wherein the radial bearing and the axial bearing provide contact free mounting of the rotor to the stator.

2. The high frequency rotary joint according to claim 1, wherein the axial and radial air bearings are disposed outside of a high frequency area.

3. The high frequency radial joint according to claim 1, wherein:
   the stator includes a hollow cylindrical section;
   the rotor includes a cylindrical section;
   the radial air bearing comprises a lateral surface of the hollow cylindrical section of the stator and a peripheral surface of the cylindrical section of the rotor; and
   the hollow cylindrical section of the stator is provided with a plurality of radial air outlets.

4. The high frequency rotary joint according to claim 3, wherein:
   the hollow cylindrical section comprises a perimeter and an axial length; and
   the radial air outlets are distributed over both the perimeter and the axial length of the hollow cylindrical section.

5. The high frequency rotary joint according to claim 3, wherein:
   the radial air outlets are in fluid communication with at least one generally annular channel in the stator; and
   the generally annular channel is connected to a compressed air source.

6. The high frequency rotary joint according to claim 1, wherein:
   the axial air bearing comprises a generally annular surface of the stator and a generally annular face on one face of the rotor the rotor; and
   the annular surface of the stator comprises axial air outlets.

7. The high frequency rotary joint according to claim 6, wherein:
   the generally annular surface of the stator comprises a perimeter and a radius; and
   the axial air outlets are distributed over both the perimeter and the radius of the generally annular stator surface.

8. The high frequency rotary joint according to claim 6, wherein:
   the axial air outlets communicate with at least one generally annular channel in the stator; and
   the generally annular stator channel is in communication with a compressed air source.

9. The high frequency rotary joint according to claim 1, wherein:
   the rotor comprises at least one generally annular section comprising magnetically soft material; and
   the stator comprises a magnet to magnetically attract the rotor in an area of the axial air bearing.

10. The high frequency rotary joint according to claim 9, wherein;
    the generally annular section of the rotor comprises a magnetically soft ring that comprises the magnetically soft material; and
    the remainder of the rotor comprises a light metal.

11. The high frequency rotary joint according to claim 10, wherein:

the magnetically soft ring comprises a circumference;
the magnetically soft ring is radially divided along at least one point along the circumference thereof; and
the magnetically soft ring is connected to the rotor such that the ring slides in a circumferential direction.

12. The high frequency rotary joint according to claim 10, wherein the magnet comprises polarized permanent magnets embedded into the stator and distributed evenly over the perimeter of the stator.

13. The high frequency rotary joint according to claim 12, wherein:
the permanent magnets comprise pole surfaces facing the rotor; and
a field distribution ring magnetically connects the pole surfaces of the permanent magnets.

14. The high frequency rotary joint according to claim 1, wherein the $\lambda/4$ line is radially or axially folded.

15. The high frequency rotary joint of claim 1, wherein each air bearing comprises compressed air directed into a gap between opposed parts via a plurality of air outlets selectively positioned about the rotary joint.

16. The high frequency rotary joint of claim 1, wherein each one of the air bearings comprise cushions of pressurized air that prevent the contact between the rotor and the stator.

* * * * *